(12) United States Patent
Kurdziel

(10) Patent No.: US 7,599,490 B2
(45) Date of Patent: *Oct. 6, 2009

(54) METHOD AND APPARATUS FOR DATA ENCRYPTION

(75) Inventor: Michael Thomas Kurdziel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1060 days.

This patent is subject to a terminal disclaimer.

(21) Appl. No.: 10/792,236

(22) Filed: Mar. 3, 2004

(65) Prior Publication Data

US 2005/0195974 A1    Sep. 8, 2005

(51) Int. Cl.
*H04L 9/28* (2006.01)

(52) U.S. Cl. ........................................................ 380/28

(58) Field of Classification Search ................. 380/28
See application file for complete search history.

(56) References Cited

U.S. PATENT DOCUMENTS

| | | | | | |
|---|---|---|---|---|---|
| 5,623,549 | A | * | 4/1997 | Ritter | 380/37 |
| 5,838,794 | A | * | 11/1998 | Mittenthal | 380/28 |
| 5,838,795 | A | * | 11/1998 | Mittenthal | 380/28 |
| 5,838,796 | A | * | 11/1998 | Mittenthal | 380/28 |
| 6,108,421 | A | | 8/2000 | Kurdziel et al. | 380/28 |
| 6,182,216 | B1 | * | 1/2001 | Luyster | 713/168 |
| 6,199,162 | B1 | * | 3/2001 | Luyster | 713/168 |
| 6,578,150 | B2 | * | 6/2003 | Luyster | 380/37 |
| 6,751,319 | B2 | * | 6/2004 | Luyster | 380/37 |
| 6,769,063 | B1 | * | 7/2004 | Kanda et al. | 713/193 |
| 7,251,326 | B2 | * | 7/2007 | Kurdziel | 380/37 |
| 2001/0038693 | A1 | * | 11/2001 | Luyster | 380/37 |
| 2003/0174835 | A1 | * | 9/2003 | Yokota et al. | 380/28 |
| 2004/0131182 | A1 | * | 7/2004 | Rogaway | 380/37 |

* cited by examiner

*Primary Examiner*—Christian LaForgia
(74) *Attorney, Agent, or Firm*—Allen, Dyer, Doppelt, Milbrath & Gilchrist, P.A.

(57) ABSTRACT

A block cipher device for a cryptographically secured digital communication system includes a pair of first stages connected in parallel for receiving an input data block and a control data block. Each first stage defines a respective first data path and includes a sum modulo-two unit for receiving the control data block and the input data block. Each first stage also includes a first nibble swap unit downstream from the sum modulo-two unit. A key scheduler generates a random key data block based upon a received key data block. A pair of second stages is connected in parallel downstream from the first stages and receives the random key data block, the control data block and output signals from the first stages for providing an output data block. Each second stage defines a respective second data path and includes a plurality of modulo units. The block cipher device further includes a bit diffuser connected in both of the first data paths for mixing data therebetween.

35 Claims, 7 Drawing Sheets

METHOD AND APPARATUS FOR DATA ENCRYPTION

GOVERNMENT LICENSE RIGHTS

The U.S. Government has a paid-up license in this invention and the right in limited circumstances to require the patent owner to license others on reasonable terms as provided for by the terms of contract No. MDA904-99-C-6511, awarded by the U.S. Government.

FIELD OF THE INVENTION

The present invention is directed to communication systems, and more specifically, to a cryptographically secured digital communication system.

BACKGROUND OF THE INVENTION

Cryptography is a security mechanism for protecting information from unintended disclosure. The cryptographic transformation is performed on data that is to be transmitted. The transformation process performed on the original data is referred to as encryption. The process of reversing the transformation, i.e., to restore the original data, is referred to as decryption. The terms encipher and decipher are also used to describe these processes. A mechanism that can both encipher and decipher may be referred to as a block cipher device.

Cryptographically secured digital communication systems are well known. In general, such systems operate by performing an encryption operation on a plaintext input data block using an encryption key to produce a ciphertext output data block. Plaintext refers to the fact that the data is in plain, unencrypted form. Ciphertext indicates that the data is in enciphered or encrypted form. The receiver of an encrypted message performs a corresponding decryption operation using a decryption key to recover the original plaintext input data block.

A block cipher device can be implemented in hardware, software or a combination of hardware and software. However, hardware typically provides better protection against popular cryptanalysis or cracking techniques.

One example of a block cipher device is disclosed in U.S. Pat. No. 6,108,421 to Kurdziel et al., which is hereby incorporated in its entirety by reference and which is assigned to the current assignee of the present invention. The block cipher device in the '421 patent includes a first stage, a key scheduler and a second stage.

In particular, the first stage includes a plurality of serially connected units for generating an output signal based upon an input data block and a control data block. The key scheduler generates a random key data block based upon a received key data block. The second stage also includes a plurality of serially connected units, and generates an output data block for the block cipher device based upon the output signal from the first stage, the random key data block and a subset of the control data block.

Recent changes in U.S. export laws now allow more secure cryptography systems operating with longer key lengths to be offered to international customers. The '421 patent discloses that the various cipher operations performed in the block cipher device can be scaled to accommodate a larger number of bits, i.e., with respect to the input data block and the key data block. However, there is a practical limit in terms of the number of bits to which the various cipher operations can be scaled to accommodate. For example, the first and second stages each comprise modulo operation units for performing modulo operations, and these modulo operation units are limited in their range of being scaled.

The block cipher device in the '421 patent is thus limited in the size of an input data block and a key data block that it can receive and process. This causes cryptography systems incorporating the block cipher device to be undesirable to international customers desiring a more secure cryptography system. While there is a demand for more secure cryptography systems, there is also a demand that these systems be compatible with current cryptography systems that are not as secure, such as the block cipher device disclosed in the '421 patent.

SUMMARY OF THE INVENTION

In view of the foregoing background, an object of the present invention is to provide a more secure cryptography system.

Another object of the present invention is to provide a more secure cryptography system that is compatible with existing less secure cryptography systems.

These and other objects, advantages and features in accordance with the present invention are provided by a block cipher device for a cryptographically secured digital communication system, wherein the block cipher device comprises a pair of first stages connected in parallel, a diffuser unit, a key scheduler, and a pair of second stages connected in parallel downstream from the pair of first stages.

Each first stage may define a respective first data path and may comprise a sum modulo-two unit responsive to a control data block and an input data block. A first nibble swap unit may also be downstream from the sum modulo-two unit and be responsive to an output signal therefrom and the control data block for reordering the output signal from the sum modulo-two unit.

The diffuser unit may be connected in both of the first data paths for mixing data therebetween. By mixing the data between the first data paths, this advantageously allows the digital communication system to be more cryptographically secured.

The key scheduler receives a key data block and generates a random key data block based thereon. The pair of second stages may receive the random key data block from the key scheduler, the control data block and output signals from the first stages.

Each second stage may define a respective second data path and may comprise a first linear modulo unit, an $n^{th}$ power modulo unit and a second linear modulo unit. The first linear modulo unit may be responsive to the key data block, one of the output signals from the first stages, and the control data block for performing a modulo summing operation based on a first modulus q.

The $n^{th}$ power modulo unit may be responsive to the output signal from the first linear modulo unit for performing an $n^{th}$ power modulo operation based on a second modulus p. The second linear modulo unit may be responsive to the key data block and the output signal from the $n^{th}$ power modulo unit for performing a modulo summing operation based on a third modulus r. The first, second and third modulus q, p and r may be unique from each other.

Since there are two data paths in the block cipher device in accordance with the present invention, the size of the input data block and the size of the key data block may be larger than those supported by the block cipher device disclosed in U.S. Pat. No. 6,108,421. As discussed above in the background section, there is a practical limit to which the various cipher operations within the block cipher device can be scaled to accommodate a larger number of bits (i.e., for the input data block and key data block).

Supporting a larger number of bits increases the cryptographic strength of the block cipher device. For example, the '421 patent discloses that the size of the input data block may be 64 bits and the size of the key data block may be 128 bits. To accommodate a larger size input data block and a larger size key data block, a pair of first and second stages (each with a respective first and second data path) are provided instead of one first stage and one second stage. In the block cipher device in accordance with the present invention, the input data block may be 128 bits (64 bits per data path) and the key data block may be 256 bits for example.

Another advantageous feature of the block cipher device in accordance with the preset invention is that it is backward compatible with cryptography systems that are less secure, i.e., those operating with smaller size input data blocks and smaller size key data blocks. Backward compatibility is accomplished by providing the smaller size input data block to one of the respective first and second data paths in the first and second stages, and by bypassing the bit diffuser. Likewise, the key scheduler generates a random key data block for the data path that is operational. When only one of the first and second data paths are operational, then the block cipher device in accordance with the present invention is functionally equivalent to the block cipher device disclosed in the '421 patent.

Another aspect of the present invention is directed to a method for converting an input data block into an output data block for a cryptographically secured digital communication system. The method comprises providing the input data block, a control data block and a random key data block to parallel data paths in the digital communication system, and combining the control data block and the input data block within each respective data path to provide a first data output signal for each data path. Segments of the first data output signal are transposed within each respective data path responsive to the control data block to provide a second data output signal within each data path. Data between the parallel data paths may also be mixed.

The method may further comprise performing a first linear modulo operation based on a modulus q within each data path responsive to the second data output signal, the random key data block and the control data block to provide a third data output signal within each data path. An $n^{th}$ power modulo operation based on a second modulus p may be performed within each data path responsive to the third data output signal to provide a fourth data output signal within each data path. A second linear modulo operation based on a third modulus r may be performed within each data path responsive to the random key data block and the fourth data output signal to provide an output data block. Each first, second and third modulus q, p and r may be unique from each other.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notations are used to indicate similar elements in alternative embodiments.

Figure 1:
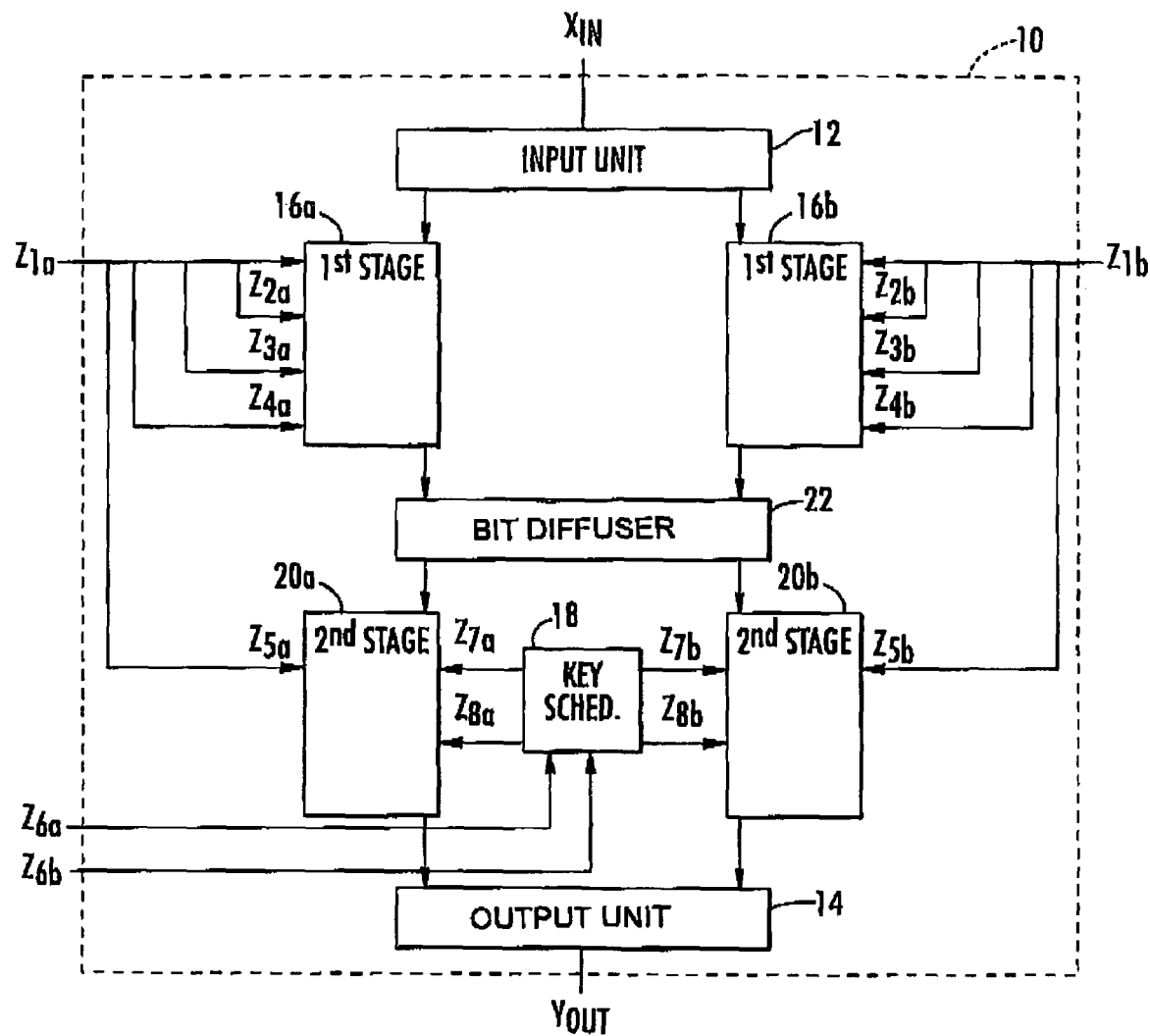
FIG. 1 is a simplified block diagram of a block cipher device in accordance with the present invention.

Referring initially to FIG. 1, a block cipher device 10 for a cryptographically secured digital communication system will be discussed. The illustrated block cipher device 10 includes an input unit 12 and an output unit 14 for assembling and buffering the input block data $X_{IN}$ and the output data block $Y_{OUT}$ to and from the block cipher device 10. The structure of the input unit 12 and output unit 14 generally depends on the intended application, and are not unique to the block cipher device 10.

The block cipher device 10 comprises a pair of first stages 16a, 16b connected in parallel and adapted to receive the input data block $X_{IN}$, and a control data block $Z_{1a}$, $Z_{1b}$ that is the same for each stage. Each first stage 16a, 16b comprises a plurality of serially connected units, and defines a respective first data path for generating an output signal, as will be discussed in greater detail with reference to FIG. 2. The plurality of serially connected units operate based upon subsets $Z_{2a}$, $Z_{3a}$, $Z_{4a}$ and $Z_{2b}$, $Z_{3b}$, $Z_{4b}$ of the control data block $Z_{1a}$, $Z_{1b}$.

A key scheduler 18 generates a random key data block based upon a received key data block $Z_{6a}$, $Z_{6b}$. A pair of second stages 20a, 20b is connected in parallel and downstream from the pair of first stages 16a, 16b, and is adapted to receive the random key data block from the key scheduler 18 in first and second key data sub-blocks $Z_{7a}$, $Z_{7b}$ and $Z_{8a}$, $Z_{8b}$. The first and second key data sub-blocks $Z_{7a}$, $Z_{7b}$ and $Z_{8a}$, $Z_{8b}$ are different for each stage. The pair of second stages 20a, 20b also receive a subset $Z_{5a}$, $Z_{5b}$ of the control data block $Z_{1a}$, $Z_{1b}$ and the output signals from the pair of first stages 16a, 16b. Each second stage 20a, 20b defines a respective second data path for generating an output signal to the output unit 14.

As will be discussed in greater detail below, the block cipher device 10 further comprises a bit diffuser 22 for mixing data between the first data paths. In other words, bits in an output signal for one of the first data paths are mixed with the bits in an output signal for the other first data path. By mixing the output signals between the first data paths, this advantageously allows the digital communication system to be more cryptographically secured.

Since there are two data paths, the size of the input data block $X_{IN}$ and the size of the key data block $Z_6$ may be larger than those supported with the block cipher device disclosed in U.S. Pat. No. 6,108,421. As discussed above in the background section, there is a practical limit to which the various cipher operations can be scaled to accommodate a larger number of bits (i.e., input data and key data). Supporting a larger number of bits increases the cryptographic strength of the block cipher device 10. For example, the '421 patent discloses that the size of the input data block may be 64 bits, and the size of the key data block may be 128 bits.

However, to accommodate a larger size input data block and a larger size key data block, a pair of first and second stages are provided instead of single first and second stages. In the illustrated block cipher device 10, the input data block may be 128 bits (64 bits per data path) for example and the key data block may be 256 bits (128 bits per data path) for example. The 128 bit and 256 bit sizes are for illustrative purposes, and other bit sizes are supported by the block cipher device 10 in accordance with the present invention, as readily appreciated by those skilled in the art.

Another advantageous feature of the illustrated block cipher device 10 is that it is backward compatible with smaller size input data blocks $X_{IN}$, and smaller size key data blocks $Z_{6a}$, $Z_{6b}$. Backward compatibility is accomplished by providing the entire input data block X to one of the first and second data paths, and by bypassing the bit diffuser 22. When only one first and second data path is operational, then the block cipher device 10 as illustrated in FIG. 1 is functionally equivalent to the block cipher device disclosed in the '421 patent.

Figure 2:
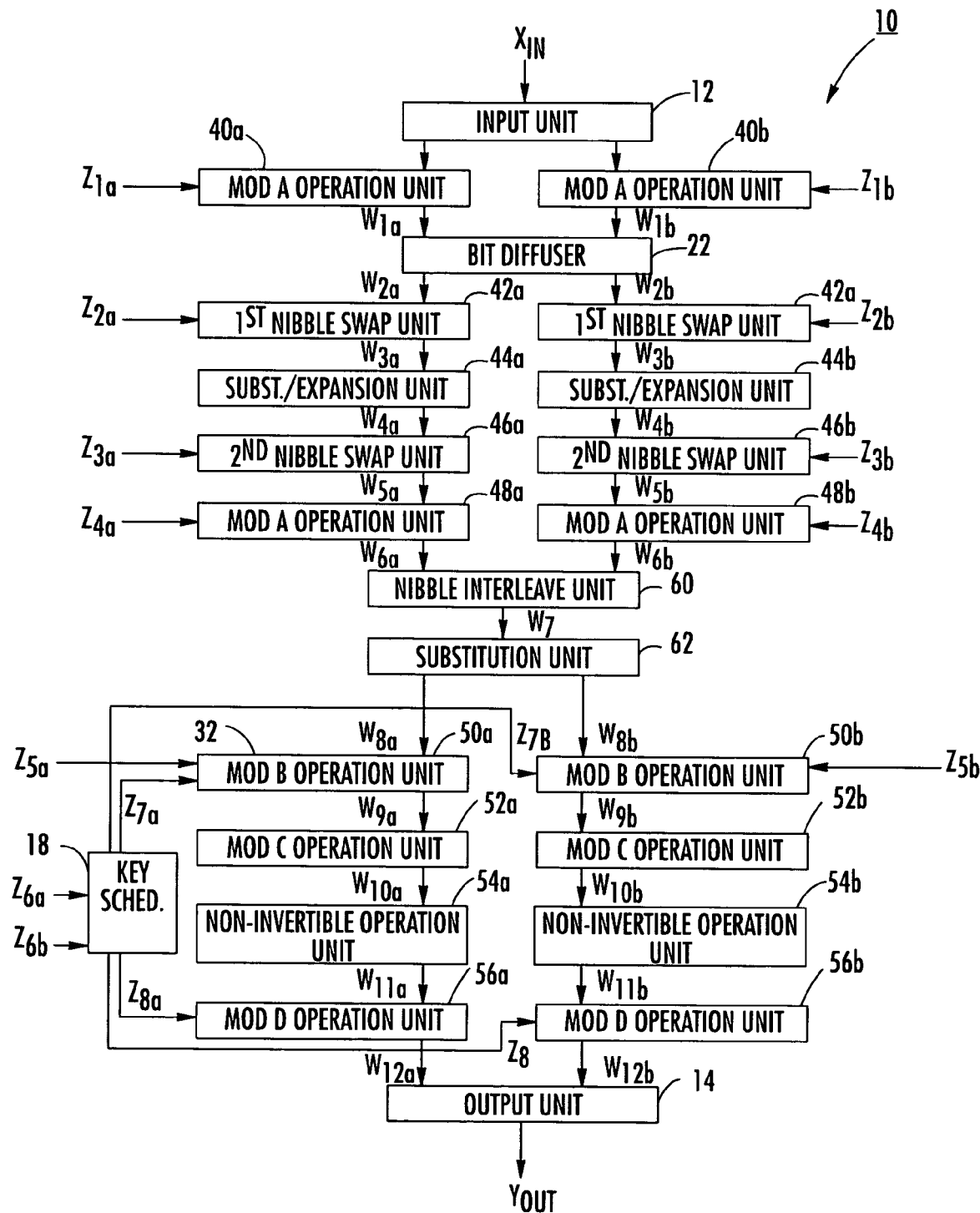
FIG. 2 is a more detailed block diagram of the block cipher device as shown in FIG. 1.

With reference now to FIG. 2, the block cipher device 10 will be discussed in greater detail. To facilitate the description, an input data block of 128 bits (64 bits per data path) and a key length of 256 bits (128 bits per data path) are used. The actual number of bits may vary by appropriately scaling the size of block cipher device operations, as readily appreciated by those skilled in the art.

The input unit 12 receives a 128 bit input data block $X_{IN}$. The input data unit 12 provides 64 bits to modulo A operation unit 40a and the other 64 bits to modulo A operation unit 40b. Each modulo A operation unit 40a, 40b performs a modulo-two addition (exclusive OR) on its portion of the input data block based upon the control data block $Z_{1a}$ or $Z_{1b}$. The control data block $Z_{1a}$, $Z_{1b}$ is also 64 bits, that is, a size of $Z_{1a}$ equals 64 bits and a size of $Z_{1b}$ equals 64 bits for example. The results are output signals $W_{1a}$ and $W_{1b}$.

Output signals $W_{1a}$ and $W_{1b}$ from the modulo A operation units 40a, 40b are provided to a 128 bit diffuser 22 for mixing the output signals between the first data paths for providing output signals $W_{2a}$ and $W_{2b}$. In other words, bits in output signal $W_{1a}$ are mixed with bits in output signal $W_{1b}$. By mixing the output signals $W_{1a}$ and $W_{1b}$ between their respective data paths, this advantageously allows the digital communication system to be more cryptographically secured. The bit diffuser 22 has been placed after the modulo A operation units 40a, 40b, however, it may be placed in other locations in the first data paths, as readily appreciated by those skilled in he art.

Output signals $W_{2a}$ and $W_{2b}$ are provided to first nibble swap units 42a, 42b. First nibble swap units 42a, 42b respectively segment $W_{2a}$, $W_{2b}$ into 8 pairs of nibbles; each nibble holding 4 bits. The first nibble swap units 42a, 42b transpose each segment based on $Z_{2a}$, $Z_{2b}$ (e.g., bits 0-7 of $Z_{1a}$, $Z_{1b}$) resulting in output signals $W_{3a}$, $W_{3b}$. For example, when the value of bit 0 in $Z_{2a}$, $Z_{2b}$ is equal to a binary 1 then the order of the nibbles pair 0 will be transposed. Likewise, if bit 0 in $Z_{2a}$, $Z_{2b}$ is equal to a binary 0 then the order is left unchanged. The order of each nibble pair will be determined by the value of the corresponding bit in $Z_{2a}$, $Z_{2b}$. The value of bit 0 controls the order of nibble pair 0, the value of bit 1 controls the order of nibble pair 1 and so on through to bit 7 which controls the order of nibble pair 7.

Custom substitution units 44a, 44b provide a custom substitution and expansion operation. The custom operation may be inserted into the block cipher device 10 in the form of a look-up table. Providing a custom unit allows unique system variations to be designed and provided while meeting the requirements of a secure cipher design. For example, the customized substitution and expansion operation of the look-up tables is only disclosed to intended end users. The custom substitution units 44a, 44b provide output signals $W_{4a}$ and $W_{4b}$.

Second nibble swap units 46a, 46b perform nibble swap operations on output signals $W_{4a}$, $W_{4b}$ based on inputs $Z_{3a}$, $Z_{3b}$ which may be bits 8 through 15 of $Z_{1a}$, $Z_{1b}$. The output signals $W_{4a}$, $W_{4b}$ may be segmented into 16 nibbles. $Z_{3a}$, $Z_{3b}$ thus control the re-ordering of $W_{4a}$, $W_{4b}$ in a slightly different manner than explained for the first nibble swap units 42a, 42b. For example, when the value of bit 8 in $Z_{3a}$, $Z_{3b}$ is equal to a binary 0 then the first nibble in the pair will be written to the first position in the high order segment of $W_{5a}$, $W_{5b}$ and the second nibble will be written to the first position in the low order segment of $W_{5a}$, $W_{5b}$. When the value of bit 8 in $Z_{3a}$, $Z_{3b}$ is equal to a binary 1 then the two nibbles will be transposed before being written to $W_{5a}$, $W_{5b}$. As with the first nibble swap units 42a, 42b, the re-ordering of each nibble pair will be determined by a corresponding bit in $Z_{3a}$, $Z_{3b}$.

The output signals $W_{5a}$, $W_{5b}$ from the second nibble swap units 46a, 46b are provided to modulo A operation units 48a, 48b for performing a modulo-two addition (exclusive OR) based upon variables $Z_{4a}$, $Z_{4b}$ which may be bits 16-31 of $Z_{1a}$, $Z_{1b}$. The results are output signals $W_{6a}$, $W_{6b}$.

Output signals $W_{6a}$, $W_{6b}$ are provided to a nibble interleave unit 60 for mixing the upper and lower nibbles in the output signals $W_{6a}$, $W_{6b}$ between the first data paths for providing output signal $W_7$. Output signal $W_7$ is provided to a substitution unit 62 for performing a "Latin squares" mapping function.

The output signals $W_{8a}$, $W_{8b}$ from the substitution unit 62 are provided to modulo B operation units 50a, 50b for performing a modulo addition operation. $W_{8a}$, $W_{8b}$ and $Z_{7a}$, $Z_{7b}$ are operands for the modulo B operation units 50a, 50b. $Z_{7a}$, $Z_{7b}$ are from the key scheduler 18. The modulus q of the operation is determined using $Z_{5a}$, $Z_{5b}$ which is represented as $Z_5$ in the following equation:

$$q = 2^{128} - Z_5 \tag{1}$$

$Z_{5a}$, $Z_{5b}$ may be bits 33 through 63 of $Z_1$. The output signals $W_{9a}$, $W_{9b}$ from the modulo B operation units 50a, 50b are provided to modulo C operation units 52a, 52b for performing a modular cubing operation. In other words, $W_{9a}$ and $W_{9b}$ are raised to the third power modulo p and the results are designated as $W_{10a}$, $W_{10b}$. The modulus p is determined by the following equation:

$$p = 2^{125} - X \tag{2}$$

The variable X is chosen such that the greatest common denominator between the order of the operation (i.e., 3) and (p-1) is equal to 1. This provides the following equation:

$$GCD(3, p-1) = 1 \tag{3}$$

The output signals $W_{10a}$, $W_{10b}$ from the modulo C operation units 52a, 52b are provided to non-invertible operation units 54a, 54b for performing non-invertible operations such as an operation known as a mid transform. The input to the operation is 128 bits in length and the output of the operation $W_{11a}$, $W_{11b}$ is 64 bits in length. The mid transform simply maps 64 bits of the input to a 64 bit output. For example, the mid transform may map bits 30 through 93 of $W_{10a}$, $W_{10b}$ to bits 0 through 63 of $W_{11a}$, $W_{11b}$. The rest of the bits in $W_{10a}$, $W_{10b}$ are discarded.

The output signals $W_{11a}$, $W_{11b}$ are provided to modulo D operation units 56a, 56b for performing an addition operation. $W_{11a}$, $W_{11b}$ and $Z_{8a}$, $Z_{8b}$ are operands of this unit. $Z_{8a}$, $Z_{8b}$ are outputs from the key scheduler 18. The modulus of the operation is chosen as $2^{64}$. The outputs of the modulo D operation units 56a, 56b are provided to the output unit 14 which provides the output data block $Y_{OUT}$ for the block cipher device 10.

Although specific values are specified for moduli of the various modulo units, the objective of the block cipher device 10 will be satisfied by a range of choices. It is required in one embodiment, that the constraint of equation 3 be satisfied and that a unique modulus be used in each stage. The modulo units along with the non-invertible units are not segmentable into a set of lower level operations.

Figure 3:
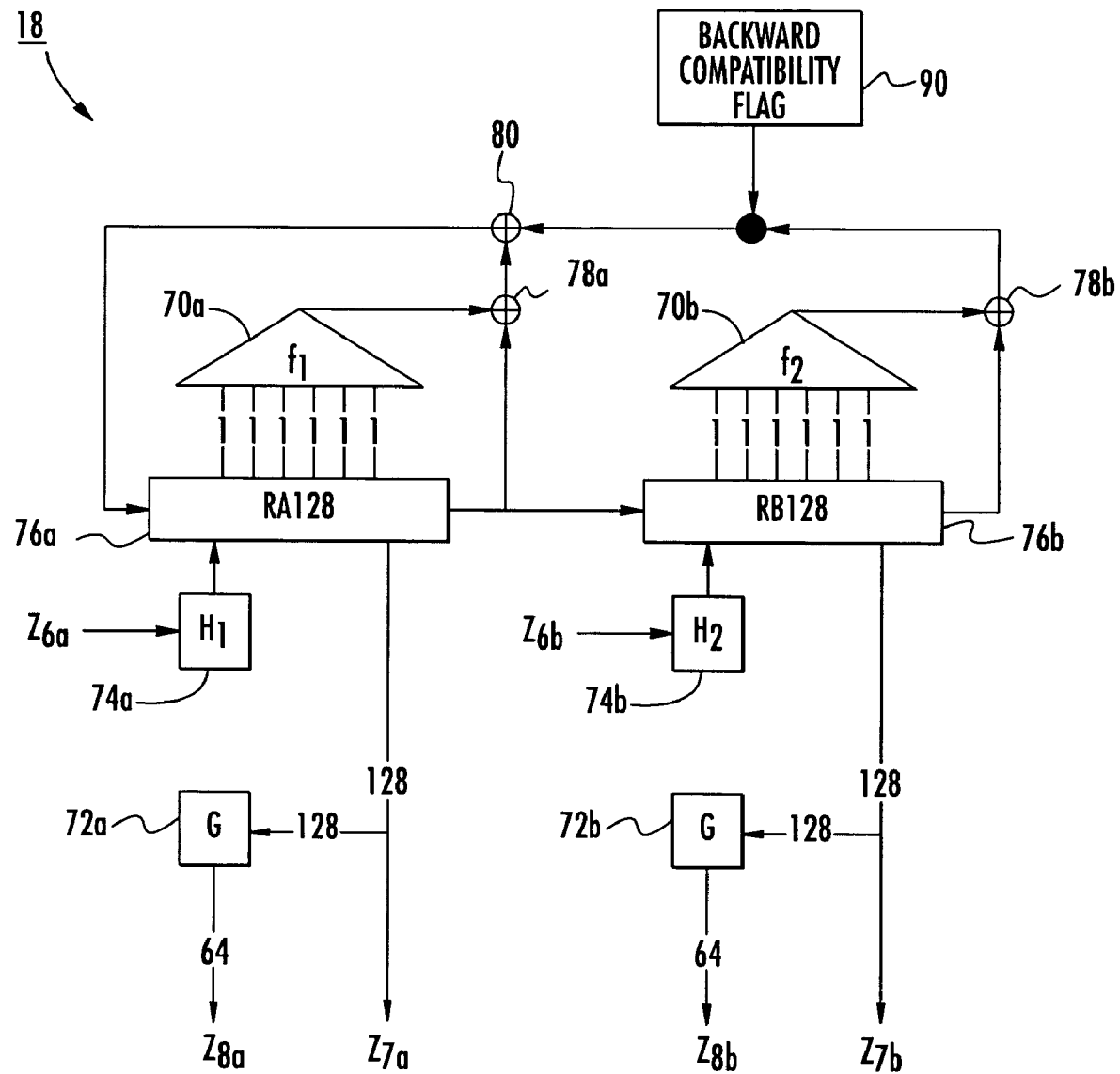
FIG. 3 is a more detailed block diagram of the key scheduler as shown in FIG. 1.

Referring now to FIG. 3, the key scheduler 18 comprises a pair of first function units 70a, 70b, a pair of second function units 72a, 72b, a pair of third function units 74a, 74b, a pair of shift registers 76a, 76b, a pair of mod-two add logic gates 78a, 78b and a single mod-two add logic gate 80.

The key scheduler 18 processes key variables $Z_{6a}$, $Z_{6a}$ to produce variables $Z_{7a}$, $Z_{7b}$ and $Z_{8a}$, $Z_{8b}$. $Z_{7a}$, $Z_{7b}$ and $Z_{8a}$, $Z_{8b}$ are used during operation of the block cipher device 10. $Z_{9a}$, $Z_{9b}$ are outputs of the third function units 74a, 74b and are stored in the shift registers 76a, 76b. The third function units 74a, 74b may be a deterministic function operating on $Z_{6a}$, $Z_{6b}$. The contents of the shift registers 76a, 76b are shifted to the right one bit at a time until its content have been completely re-circulated. With each shift, the least significant bit in each shift register 76a, 76b is mod-two added to the output of first function units 70a, 70b. The result is moved into the most significant bit position of each shift register 76a, 76b. When the contents of each of the shift registers 76a, 76b has been completely processed, the shift registers output $Z_{7a}$, $Z_{7b}$. $Z_{7a}$, $Z_{7b}$ are input to the second function units 72a, 72b to produce $Z_{8a}$, $Z_{8b}$.

The first function units 70a, 70b may be custom look-up tables mapping, for example, six one bit inputs to a single one bit output. Each of the inputs to the first function units 70a, 70b is a tap connected to an individual bit position in the shift registers 76a, 76b. The tap locations may be arbitrarily chosen with the following constraint: no tap can be connected to either the least significant or to the most significant bit positions of the shift registers 76a, 76b. The first function units 70a, 70b should meet a secure design. For example, a design for the first function unit may be customized and disclosed only to an intended end user.

The second function units 72a, 72b perform a bit-wise mod-two sum without carry of the higher and lower order halves of $Z_{7a}$, $Z_{7b}$ to produce $Z_{8a}$, $Z_{8b}$. The third function units 74a, 74b perform a bit-wise mod-two sum without carry of variables $Z_{6a}$, $Z_{6b}$ and a custom bit pattern of equal length to produce variables $Z_{9a}$, $Z_{9b}$. The custom bit pattern is disclosed only to an intended end user.

When required, the value of the original key variables $Z_{6a}$, $Z_{6b}$ may be recovered by first reloading $Z_{7a}$, $Z_{7b}$ into shift registers 76a, 76b. Shift registers 76a, 76b are then shifted to the left one bit at a time until their contents have been completely re-circulated. With each shift, the most significant bit in the shift registers 76a, 76b are mod-two summed to the output of the first function units 70a, 70b. The result is moved into the least significant bit position of each shift register 76a, 76b. When the contents of shift registers 76a, 76b have been completely processed, they are input to the third function units 74a, 74b. In the third function units 74a, 74b, the custom bit pattern is bit-wise mod-two summed to reproduce $Z_{6a}$, $Z_{6b}$.

When the block cipher device 10 is to be compatible with cryptography systems that are less secure, i.e., those operating with smaller size input data blocks (e.g., 64 bits) and smaller size key data blocks (e.g., 128 bits), a backward compatibility flag 90 is set so the first and second key data sub-blocks $Z_{7b}$, $Z_{8b}$ are not generated. When the backward compatibility flag 90 is not set, then the output from mod-two add logic gate 78b is applied to the single mod-two add logic gate 80 along with the output from mod-two add logic gate 78.

Backward compatibility is thus accomplished by providing the smaller size input data block to only one of the first and second data paths in the first and second stages 16a, 16b, 20a, 20b, and by bypassing the bit diffuser 22, the nibble interleave unit 60 and the substitution unit 62. Likewise, the key scheduler 18 generates a random key data block for the first and second data paths are operational. When only one first and second data path are operational, then the block cipher device 10 in accordance with the present invention is functionally equivalent to the block cipher device disclosed in the '421 patent.

The block cipher device 10 may be operated in various modes such as a self-synchronizing cipher feedback mode (SSCFB), a minimum error propagation (or counter) mode (MEP), or a block cipher feedback mode (BCFB). These three modes are respectively illustrated in FIGS. 4, 5 and 6.

Figure 4:
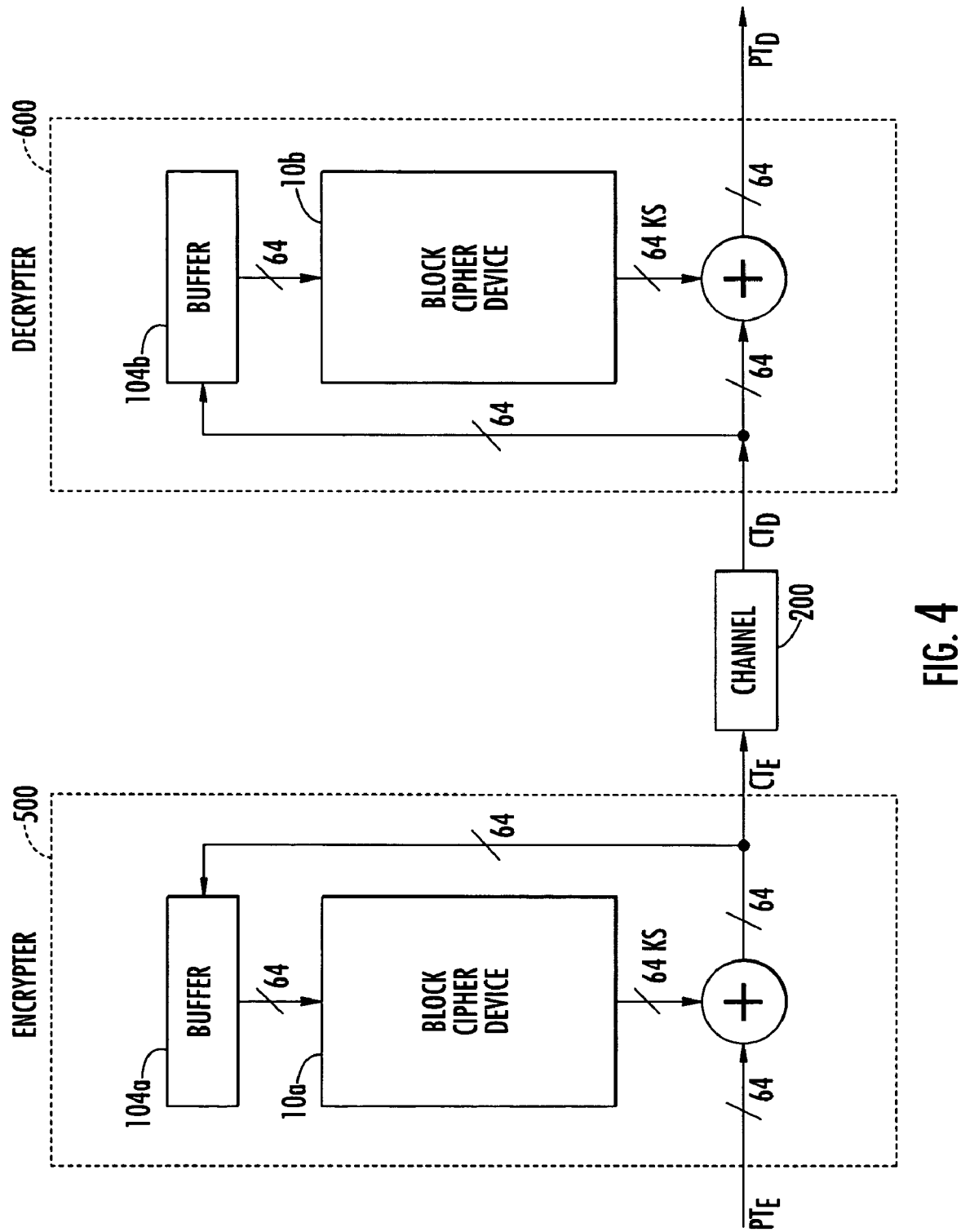
FIG. 4 is a block diagram of a cryptographically secured digital communication system in which the block cipher device as shown in FIG. 1 is operating in a block cipher feedback mode.

With reference now to FIG. 4 illustrating a BCFB mode, a block of unencrypted data or plain text (PT) is applied to the input of the encrypter 500 labeled $PT_E$. $PT_E$ is then modulo-two added to a block of key stream (KS). KS represents the output of the block cipher device 10a. CT represents the resulting block (i.e., cipher text). CT is output at the port labeled $CT_E$ and is then transmitted over a channel 200. In the next iteration, CT is fed back as input to the block cipher device 10a via buffer 104a. The block cipher device 10a processes the fed back block to produce a new block of KS. KS is then combined with the next block of $PT_E$ and the encryption process continues. At the decrypter 600, received CT is represented by $CT_D$.

$CT_D$ is combined with a block of KS to produce as output a block of recovered plain text $PT_D$. The $CT_D$ block is simultaneously applied to the input of the block cipher device 10b via buffer 104b. The block cipher device 10b uses the $CT_D$ block as input to produce another block of KS. This KS block is used to process the next block of $CT_D$. This mode is intended for relatively error free communication channels.

Figure 5:
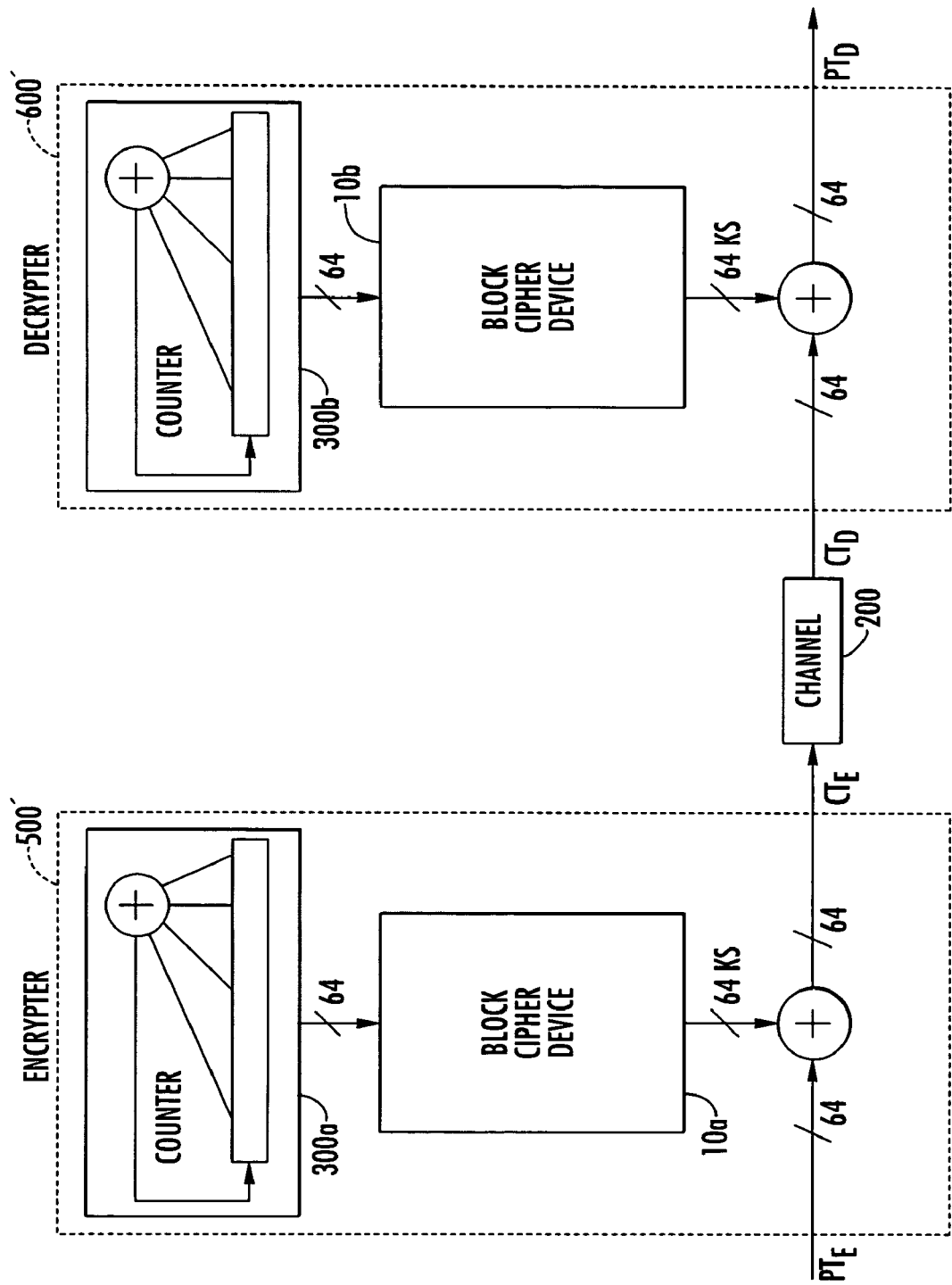
FIG. 5 is a block diagram of a cryptographically secured digital communication system in which the block cipher device as shown in FIG. 1 is operating in a minimum error propagation mode.

With reference now to FIG. 5 illustrating the MEP mode, unencrypted data or plain text (PT) is applied to the input of the encrypter 500' labeled $PT_E$. $PT_E$ is then modulo-two added to a block of KS to produce a block of cipher text CT. CT is output at a port labeled $CT_E$ and is then transmitted over the channel 200. For a next iteration, encrypter counter is incremented and the output of the counter 300a is input to the block cipher device 10a. The block cipher device 10a produces a new block of KS. The new block of KS is then combined with the next block of $PT_E$ and the encryption process continues. At the decrypter 600', received CT is represented by $CT_D$. $CT_D$ is combined with a block of KS to produce as output a block of recovered plain text $PT_D$ and decrypter counter 300b is incremented. The block cipher device 10b uses the output of the counter 300b to produce another block of KS. This KS block is used to process the next block of $CT_D$. This mode is intended for noisy or error prone communication channels. A toggled bit error on the channel will likely result in only a one bit error on $PT_D$. In other words, in this mode the cryptographic system will likely have only one bit of error extension.

Figure 6:
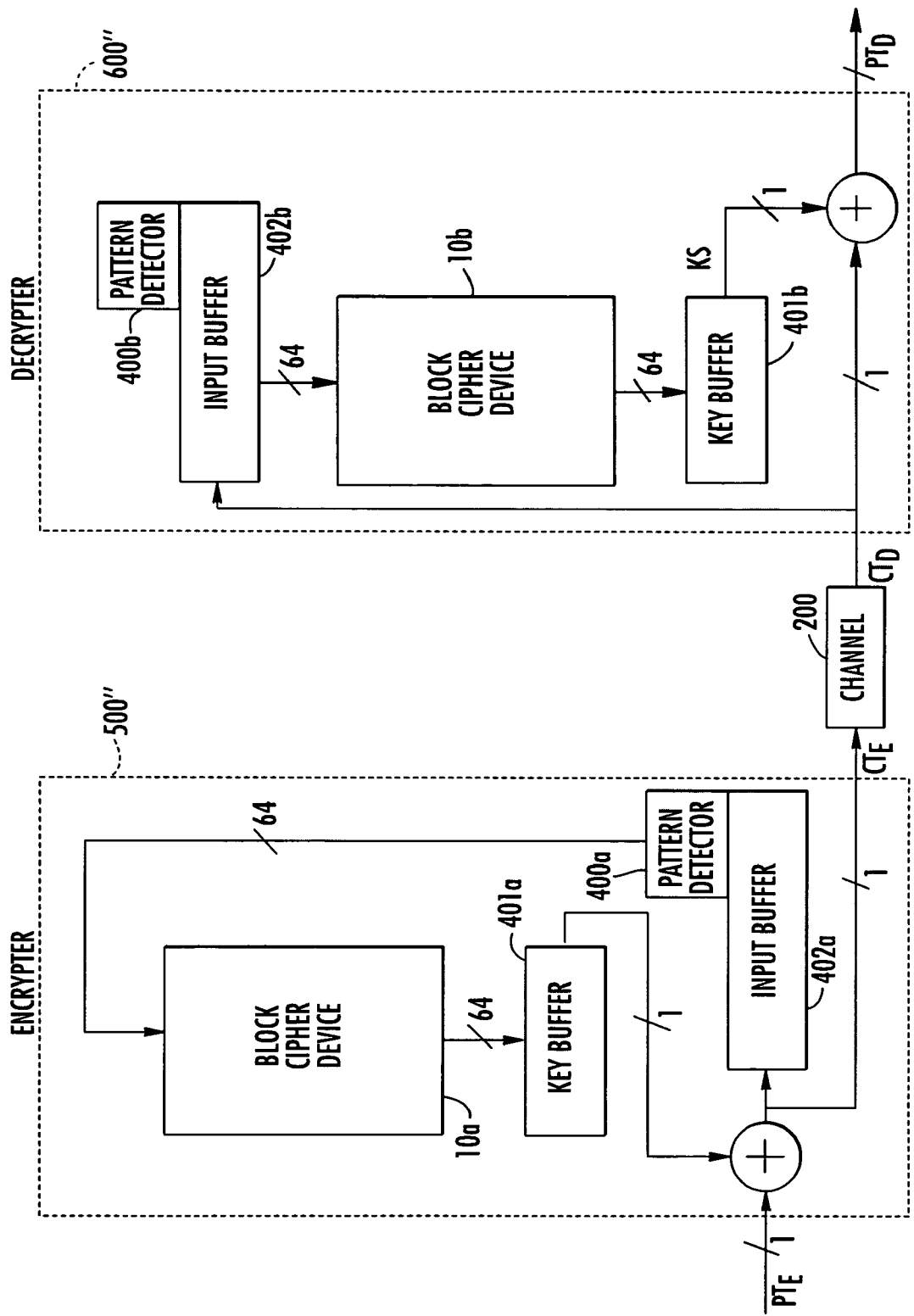
FIG. 6 is a block diagram of a cryptographically secured digital communication system in which the block cipher device as shown in FIG. 1 is operating in a self-synchronizing cipher feedback mode.

With reference now to FIG. 6 illustrating the SSCFB mode, unencrypted data or plain text (PT) at the encrypter 500" is applied one bit at time to the input labeled $PT_E$. Each $PT_E$ bit is modulo-two added to a bit of KS to produce a bit of cipher text CT. Encryption continues until another iteration is initiated. Another iteration may begin when either the entire block of KS is consumed or when the pattern detector 400a is triggered. The pattern detector 400a continually monitors CT for a specific bit sequence and when the sequence is detected a new iteration is triggered. Because CT appears statistically random, this mechanism will initiate a new iteration at pseudo-random intervals. When a new iteration is initiated, all remaining KS is purged from the key buffer 401a and the most recent bit block of $CT_E$ is input to the block cipher device 10a. The block cipher device 10a uses the most recent block as input to produce another block of KS. The new block of KS is stored in the key buffer 401a and is used to continue the encryption process. At the decrypter 600", the received CT is applied one bit at a time to the input labeled $CT_D$. Each $CT_D$ bit is modulo-two added with a bit of KS to produce a bit of recovered plain text as output $PT_D$. The CT bit stream is simultaneously applied to the input buffer 402b of the block cipher device 10b.

When either the input buffer 402b becomes full or the pattern detector 400b triggers, the following will occur:

1) the key buffer 401b is purged;
2) the most recent block of $CT_E$ is input to the block cipher device 10b;
3) the block cipher device uses the most recent block of $CT_E$ to produce a new block of KS; and
4) the new block of KS is stored in the key buffer 401b.

The block cipher device 10b continues processing and $CT_D$ continues to be shifted into input buffer 402b until another iteration is initiated. This mode is intended for communication channels that are subject to synchronization errors. In this mode, a communication system will be able to automatically recover from loss of cryptographic and block boundary synchronization.

To operate in any of the modes shown in FIGS. 4, 5 and 6, the encrypters 500, 500', 500" and the decrypters 600, 600', 600" must first be initialized such that their internal states are all identical. Initialization may be obtained using an initialization vector IV which is generated on the encrypter side and is used to initialize all internal states of the encrypter. The IV is then transmitted over the channel 200 to the decrypter. Using the IV, all internal states of the decrypter are initialized to the same values.

Figure 7:
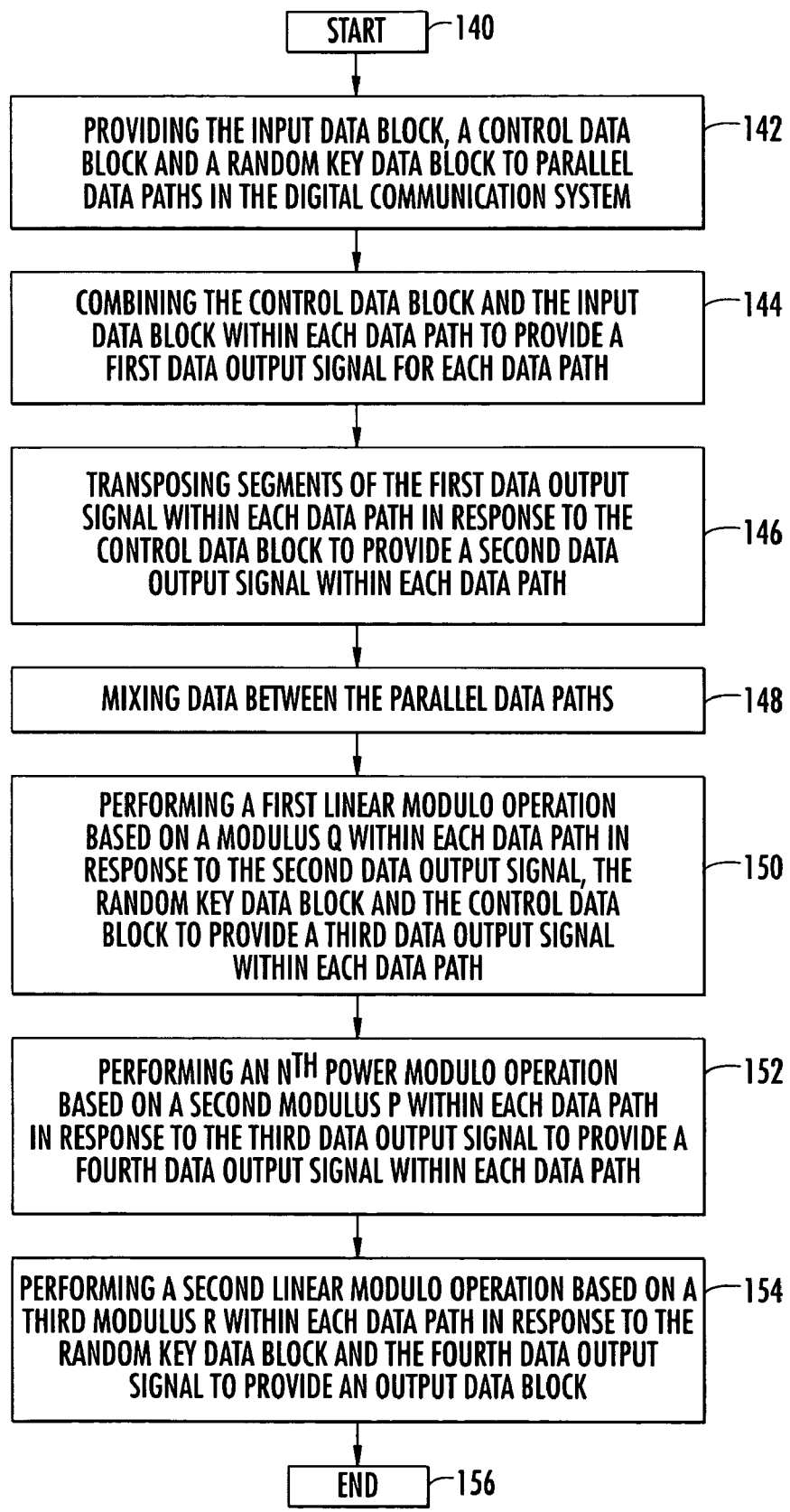
FIG. 7 is a flowchart illustrating a method for converting an input data block into an output data block for a cryptographically secured digital communication system in accordance with the present invention.

Another aspect of the present invention is directed to a method for converting an input data block into an output data block for a cryptographically secured digital communication system. Referring now to FIG. 7, from the start (Block 140), the method comprises providing the input data block, a control data block and a random key data block to parallel data paths in the digital communication system at Block 142. The control data block and the input data block within each data path are combined at Block 144 to provide a first data output signal for each data path. Segments of the first data output signal are transposed within each data path in responsive to the control data block to provide a second data output signal within each data path at Block 146. Data between the parallel data paths are mixed at Block 148.

The method further comprises performing a first linear modulo operation based on a modulus q within each data path in response to the second data output signal, the random key data block and the control data block to provide a third data output signal within each data path at Block 150.

An $n^{th}$ power modulo operation based on a second modulus p within each respective data path is performed responsive to the third data output signal to provide a fourth data output signal within each data path at Block 152, and a second linear modulo operation based on a third modulus r within each respective data path is performed responsive to the random key data block and the fourth data output signal to provide an output data block at Block 154. Each first, second and third modulus q, p and r may be unique from each other. The method ends at Block 156.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A block cipher device for a cryptographically secured digital communication system comprising:

a pair of first stages connected in parallel and receiving an input data block and a control data block, each first stage defining a respective first data path and comprising
a sum modulo-two unit responsive to the control data block and the input data block, and
a first nibble swap unit downstream from said sum modulo-two unit and being responsive to an output signal therefrom and the control data block for reordering the output signal front said sum module-two unit;

a diffuser connected in both of the first data paths for mixing data therebetween;

a key scheduler receiving a key data block and generating a random key data block based thereon;

a pair of second stages connected in parallel downstream from said first stages and receiving the random key data block, the control data block and output signals from said first stages, each second stage defining a respective second data path and comprising
a first linear modulo unit responsive to the random key data block, one of the output signals from said first stages, and the control data block for performing a modulo summing operation based on a first modulus q,
an $n^{th}$ power modulo unit responsive to an output signal from said first linear modulo unit for performing an $n^{th}$ power modulo operation based on a second modulus p, and
a second linear modulo unit responsive to the random key data block and an output signal from said $n^{th}$ power modulo unit for performing a modulo summing operation based on a third modulus r,
each first, second and third modulus q, p and r being unique from each other, and
said pairs of first and second stages each being selectively configurable so that only one first data path and only one second data path are operational while bypassing said diffuser; and an output stage connected to said second stages for generating an output data block for the block cipher.

2. A block cipher device according to claim 1 wherein said diffuser is connected in both of the first data paths between the respective sum modulo-two units and first nibble swap units.

3. A block cipher device according to claim 1 wherein each first stage further comprises a substitution/expansion unit downstream from said first nibble swap unit and being responsive to an output signal therefrom for providing customizable cipher variations.

4. A block cipher device according to claim 3 wherein each first stage further comprises a second nibble swap unit downstream from said substitution/expansion unit and being responsive to an output signal therefrom and the control data block for reordering the output signal from said substitution/expansion unit.

5. A block cipher device according to claim 1 further comprising a nibble interleave unit connected in both of the first data paths for reordering data therebetween.

6. A block cipher device according to claim 1 further comprising a substitution unit connected in both of the first data paths for substituting data therebetween.

7. A block cipher device according to claim 1 wherein each $n^{th}$ power modulo unit provides an output signal of predetermined size, with n<1 and with $p=2^K-X$, where X is selected such that a greatest common denominator between n and $(2^K-X-1)$ is 1 and K is the predetermined size.

8. A block cipher device according to claim 1 wherein said key scheduler comprises a pair of look-up tables for generating the random key data block.

9. A block cipher device according to claim 8 wherein said key scheduler further comprises a pair of shift registers responsive to the received key data block; and wherein each look-up table is responsive to a corresponding shift register.

10. A block cipher device according to claim 9 wherein said key scheduler further comprises a pair of combiners responsive to outputs from said shift registers and to outputs from said look-up tables, each combiner combining the output from a corresponding shift register and the output from a corresponding look-up table using a modulo-two summing operation, and each combiner providing a combined data output.

11. A block cipher device according to claim 1 wherein each second stage further comprises a non-invertible operation unit downstream from said $n^{th}$ power modulo unit and being responsive to an output signal therefrom, said noninvertible operation unit discarding a portion of the output signal from said $n^{th}$ power modulo unit.

12. A communication system comprising:
a block cipher device for converting an input data block into an output data block, said block cipher comprising
a pair of first stages connected in parallel and receiving the input data block and a control data block, each first stage defining a respective data path and comprising
a first unit responsive to the control data block and the input data block, and
a second unit downstream from said first unit and being responsive to an output signal therefrom and the control data block for reordering the output signal from said first unit;
a diffuser connected in both of the data paths for mixing data therebetween;
a key scheduler receiving a key data block and generating a random key data block based thereon;
a pair of second stages connected in parallel downstream from said first stages and receiving the random key data block, the control data block and output signals from said first stages, each second stage defining a respective second data path and comprising
a first modulo unit responsive to the random key data block, one of the output signals from said first stages, and the control data block for performing a modulo operation based on a first modulus q,
an $n^{th}$ power modulo unit responsive to an output signal from said first modulo unit for performing an n power modulo operation based on a second modulus p, and
a second modulo unit responsive to the random key data block and an output signal from said $n^{th}$ power modulo unit for performing a modulo operation based on a third modulus r,
each first, second and third modulus q, p and r being unique from each other, and
said pairs of first and second stages each being selectively configurable so that only one first data path and only one second data path are operational while bypassing said diffuser; and
an output stage connected to said second stages for generating an output data block for said block cipher device.

13. A communication system according to claim 12 wherein said first unit comprises a sum modulo-two unit, said second unit comprises a nibble swap unit, and said first and second modulo units comprise first and second linear modulo units for performing summing operations.

14. A communication system according to claim 12 wherein said block cipher device operates as an encrypter.

15. A communication system according to claim 12 wherein said block cipher device operates as a decrypter.

16. A communication system according to claim 12 further comprising circuitry connected to said block cipher device so that said block cipher device operates in at least one of a block cipher feedback mode, a minimum error propagation mode and a self-synchronizing feedback mode.

17. A communication system according to claim 12 wherein said diffuser is connected in both of the first data paths between the respective first and second units.

18. A communication system according to claim 12 wherein each first stage further comprises a substitution/expansion unit downstream from said second unit and being responsive to an output signal therefrom for providing customizable cipher variations.

19. A communication system according to claim 18 wherein each first stage further comprises a second nibble swap unit downstream from said substitution/ expansion unit and being responsive to an output signal therefrom and the control data block for reordering the output signal from said substitution/expansion unit.

20. A communication system according to claim 12 further comprising a nibble interleave unit connected in both of the first data paths for reordering data therebetween.

21. A communication system according to claim 12 further comprising a substitution unit connected in both of the first data paths for substituting data therebetween.

22. A communication system according to claim 12 wherein each $n^{th}$ power modulo unit provides an output signal of predetermined size, with n<1 and with $p=2^K-X$, where X is selected such that a greatest common denominator between n and $(2^K-X-1)$ is 1 and K is the predetermined size.

23. A communication system according to claim 12 wherein said key scheduler comprises a pair of look-up tables for generating the random key data block.

24. A communication system according to claim 23 wherein said key scheduler further comprises a pair of shift registers responsive to the received key data block; and wherein each look-up table is responsive to a corresponding shift register.

25. A communication system according to claim 24 wherein said key scheduler comprises a pair of combiners responsive to outputs from said shift registers and to outputs from said look-up tables, each combiner combining the output from a corresponding shift register and the output from a corresponding look-up table using a modulo-two summing operation, and each combiner providing a combined data output.

26. A communication system according to claim 12 wherein each second stage further comprises a non-invertible operation unit downstream from said $n^{th}$ power modulo unit and being responsive to an output signal therefrom, said non-invertible operation unit discarding a portion of the output signal from said $n^{th}$ power modulo unit.

27. A method for converting an input data block into an output data block for a cryptographically secured digital communication system, the method comprising:
   providing the input data block, a control data block and a random key data block to parallel data paths in the digital communication system;
   combining the control data block and the input data block within each data path to provide a first data output signal for each data path;
   transposing segments of the first data output signal within each data path in response to the control data block to provide a second data output signal within each data path;
   mixing data between the parallel data paths;
   performing a first linear modulo operation based on a modulus q within each data path in response to the second data output signal, the random key data block and the control data block to provide a third data output signal within each data path;
   performing an $n^{th}$ power modulo operation based on a second modulus p within each respective data path in response to the third data output signal to provide a fourth data output signal within each data path;
   performing a second linear modulo operation based on a third modulus r within each respective data path in response to the random key data block and the fourth data output signal to provide an output data block, each first, second and third modulus q, p and r being unique from each other; and
   the cryptographically secured digital communication system being selectively configurable so that only one data path is operational while mixing of the data is bypassed.

28. A method according to claim 27 further comprising performing a substitution/expansion operation within each data path on the second data output signal to provide customizable cipher variations.

29. A method according to claim 28 further comprising performing a nibble swap operation within each data path on the customizable cipher variations in response to the control data block for reordering the customizable cipher variations.

30. A method according to claim 29 further comprising performing a nibble interleave operation for reordering data between the data paths for the reordered customizable cipher variations.

31. A method according to claim 30 further comprising performing a substitution operation after the nibble interleave operation for substituting the reordered customizable cipher variations between the parallel data paths.

32. A method according to claim 27 wherein each $n^{th}$ power modulo operation provides an output signal of predetermined size, with n>1 and with $p=2^K-X$, where X is selected such that a greatest common denominator between n and $(2^K-X-1)$ is 1 and K is the predetermined size.

33. A method according to claim 27 wherein the random key data block is generated by a key scheduler comprising a pair of look-up tables.

34. A method according to claim 33 wherein the key scheduler further comprises a respective shift register associated with each look-up table.

35. A method according to claim 34 wherein the key scheduler further comprises a pair of combiners responsive to outputs from the shift registers and to outputs from the look-up tables, each combiner combining the output from a corresponding shift register and the output from a corresponding look-up table using a modulo-two summing operation, and each combiner providing a combined data output.

* * * * *